Sept. 29, 1931.  J. S. SHAW  1,825,552
SPEED CHANGING AND REVERSING GEAR
Filed Nov. 6, 1929  4 Sheets-Sheet 4
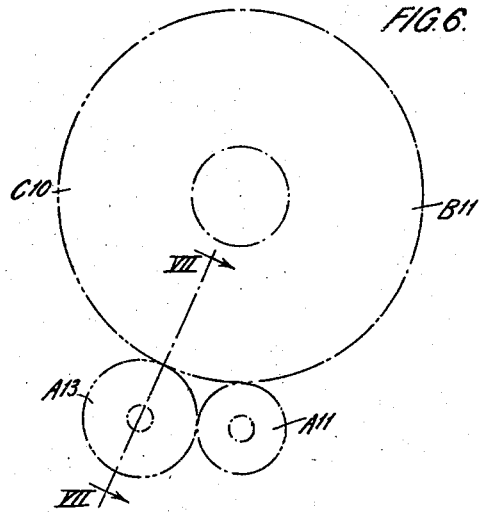
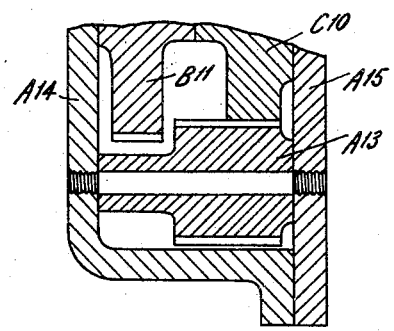
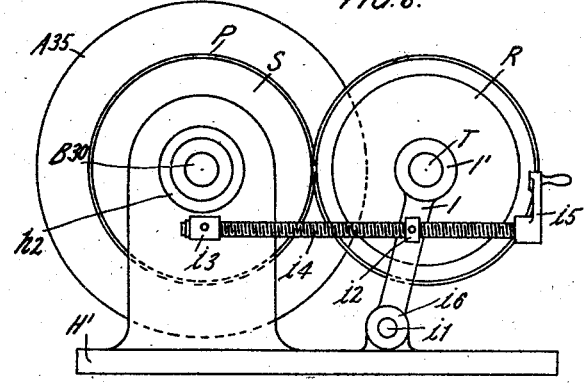

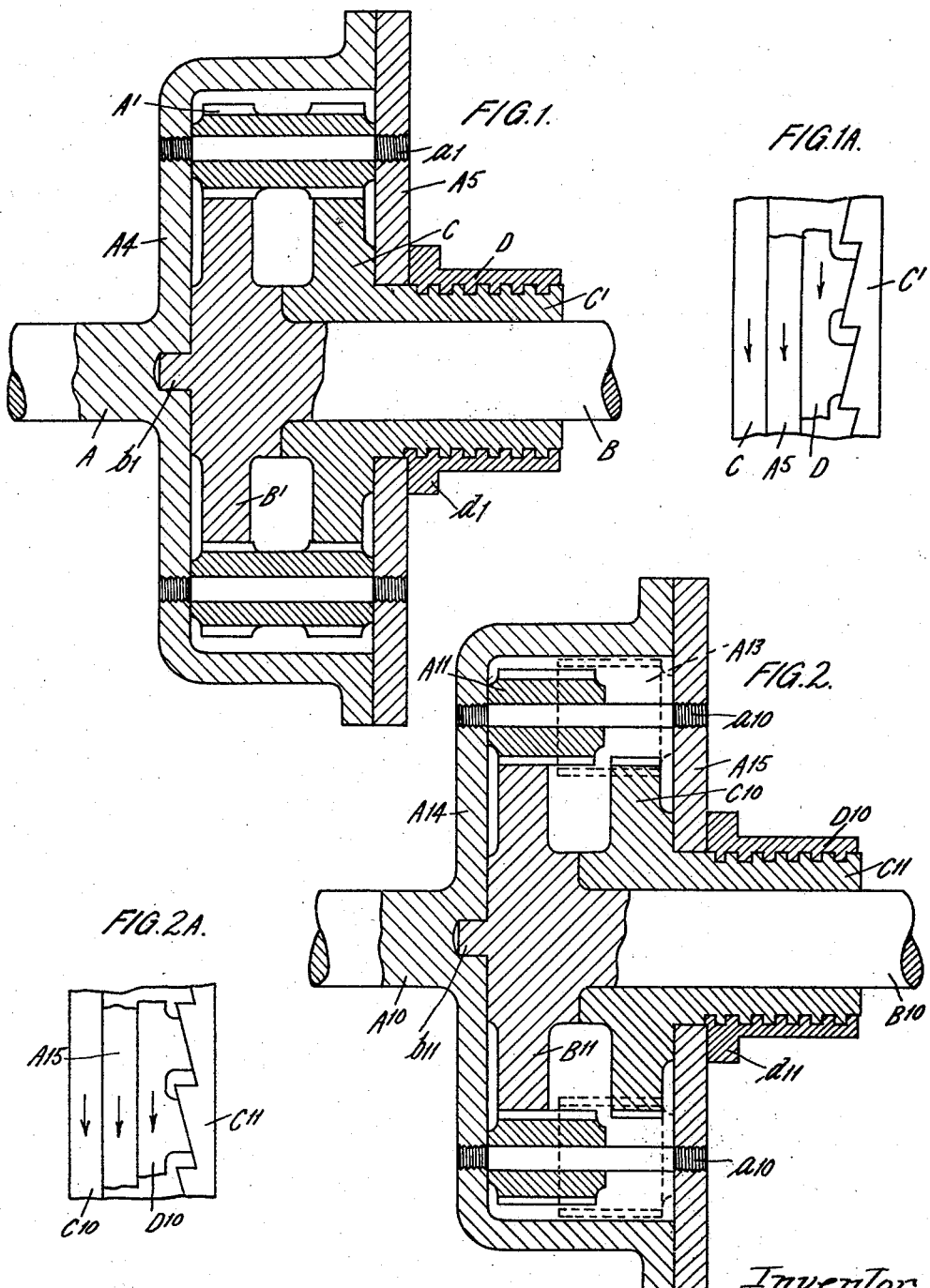

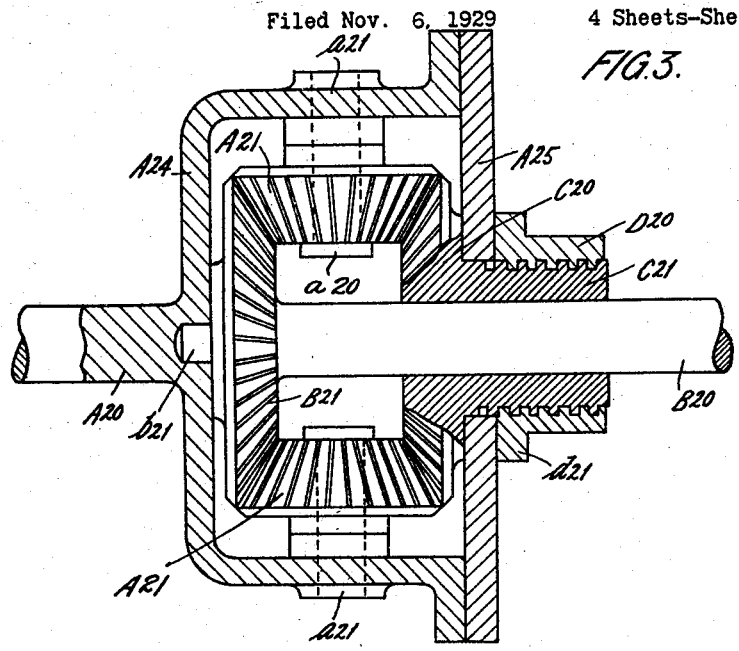
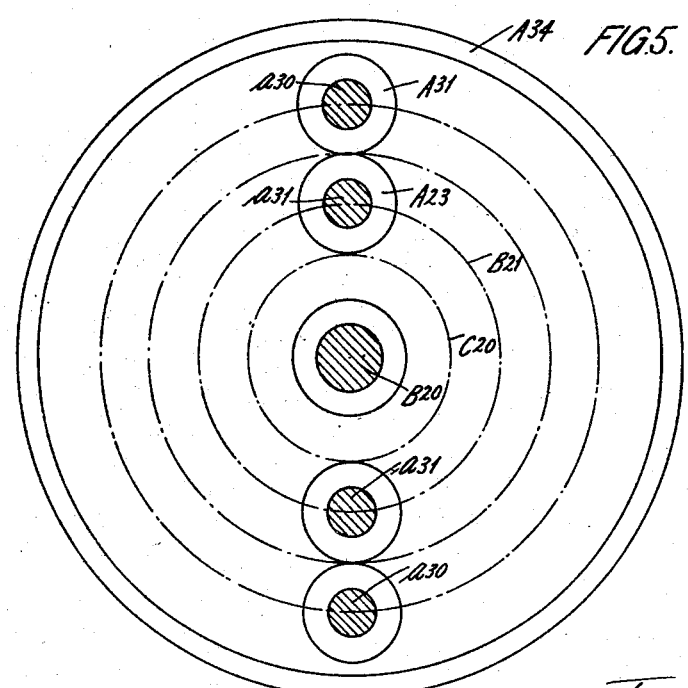

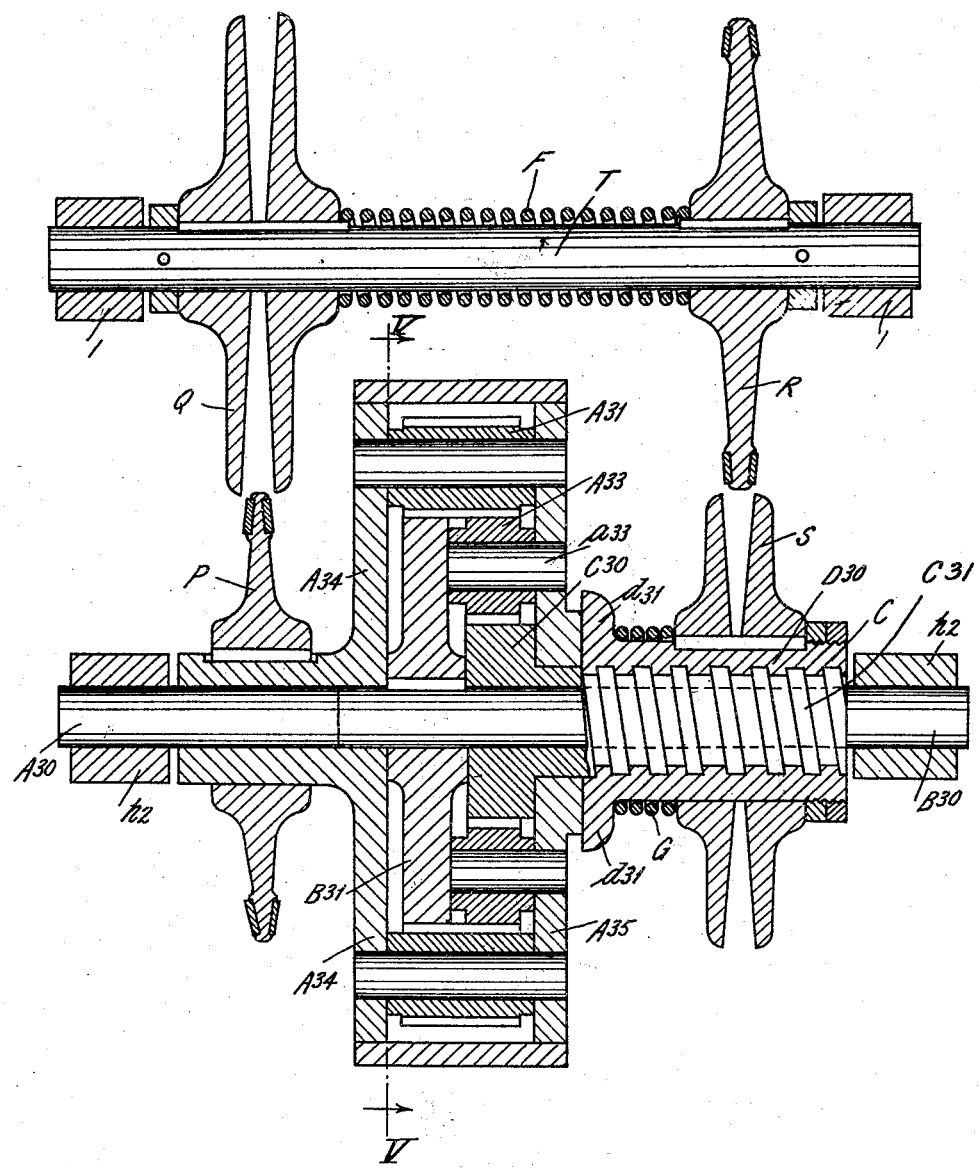

Patented Sept. 29, 1931

1,825,552

UNITED STATES PATENT OFFICE

JOHN STANDEN SHAW, OF FAZAKERLEY, LIVERPOOL, ENGLAND

SPEED CHANGING AND REVERSING GEAR

Application filed November 6, 1929, Serial No. 405,139, and in Great Britain November 13, 1928.

This invention relates to speed changing and reversing gear, the object being to provide an inexpensive, simple and effective gear by which speed variations may be made in continuous manner, as distinguished from a step-by-step manner.

I have illustrated my invention in the accompanying drawings, in which:—

Figs. 1, 1A, 2, 2A and 3 are diagrammatic views for explanatory purposes.

Figs. 1, 2 and 3 are conventional longitudinal sections.

Figs. 1A and 2A are fragmentary views of details.

Figs. 4, 5, 6 which are also in the main diagrammatic, show the general arrangement of the preferred form suitable, for example, when combined with a reversing gear for a motor vehicle drive.

Fig. 4 is a side elevation in longitudinal medial section.

Fig. 5 is an end elevation in section on the line V, V of Fig. 4.

Fig. 6 is a fragmentary end elevation.

Fig. 7 is a fragmentary section on the line VII, VII of Fig. 6, and

Fig. 8 is an end view, to a smaller scale.

Throughout the drawings A, by appropriate numerals is employed to denote the driving shaft and the parts rotated therewith; in like manner, B distinguished by appropriate numerals denotes the driven shaft and the parts rotated therewith, and C distinguished by appropriate numerals denotes the control member of the epicyclic gear.

Referring first to Fig. 1:—

A and B are respectively the driving and driven shafts, A1 the planetary pinions element of the epicyclic gear; the pinions are mounted on spindles carried by the casing A4, which is driven by the driving shaft A; B1 is the element of the epicyclic gear connected to the shaft B; and C is the third or control element of the epicyclic gear.

The casing A4 which carries the axes $a1$ of the planetary pinions A' is, for clearness, shown integral with the driving shaft, and the spur wheel B' is likewise shown integral with the driven shaft B, which latter is maintained in concentric relationship by the spigot $b1$; the spur wheel member C is journalled in the bore of the cover A5 of the casing, and forms a sleeve bearing for the shaft B; the part C' protrudes through the cover A5 and is screw-threaded or provided with equivalent cam surfaces and fitted with the rotating or control part D which when C' is screw-threaded as shown is a nut fitting said screw-threads; the flange $d1$ of the part D is adapted to bear against the outside face of the cover A5 so that relative angular movement between C and D in the one direction causes the facing part C frictionally to engage with the part A5. The wheels B' and C gear with one or more suitably spaced pinions A' each mounted on a spindle $a1$ carried by the casing A4 and its cover A5.

The nut D is driven in any convenient manner, for example, by the shaft A through the cone gear P, Q, R, S, of Fig. 5 which permit its speed relatively to the driving shaft to be varied in continuous manner.

If the nut or control member be rotated in the same direction and at the same speed as the driving shaft, the gear will rotate as a whole, in which case the driving and driven shafts rotate at the same speed; the "hand" of the screw threads on the part C' is such that should the engaging part C tend to rotate less rapidly than the control part D, the frictional grip between C and A5 is augmented sufficiently to ensure C rotating with A5 and D.

Once the frictional grip between C and A5 has been established, the secondary variable speed gear driving the control member may be rendered inoperative, whereupon the gear will automatically rotate en bloc with a velocity ratio of 1 to 1 between driving and driven shafts.

If the rotation of D be stopped, any tendency of the part C to rotate causes the nut D to move away from A5 and this frees the part C from frictional engagement with the part A5; if therefore there is any resistance of the motion of the shaft B, the latter under the circumstances remains stationary, the planet pinions rotating on their own axis and rolling over the wheels B' and C as the casing is rotated, the wheel C being then also stationary; the speed of the driven shaft can be varied in continuous manner between these limits by continuously varying the speed of D between zero and the speed of the driving shaft. For example, if the speed of the driving shaft be 400 R. P. M. clockwise, and the speed of D be continuously raised from 0 to say, 300 R. P. M. clockwise, and be maintained at 300, then the speed of the wheel C will be continuously raised to 300, and be maintained at that speed, since if its speed should fall below that of D, the latter is instantly moved axially by the screw action towards C, and the grip between C and the part A5 (assumed to be rotating at 400 R. P. M.) will be increased until it suffices to provide the frictional grip between C and A5 to drive C at 300, under which conditions if the wheels B' and C have the same number of teeth, the driven shaft will rotate at 300 R. P. M. clock-wise; and in the same way for any other speed of D up to the maximum 400 R. P. M. If under these conditions C tends to rotate at a higher speed than 300, relative rotation between C and D will cause D to move away from A5 and C will lose its frictional grips on the part A5 until its speed falls to 300 R. P. M.

In Fig. 1 the wheels B' and C have the same number of teeth and gear with the same planetary pinion, but this is not essential; two coupled planetary pinions may be mounted on each axle $a1$ and may respectively gear with wheels B and C of different diameters and numbers of teeth, in which case if the number of teeth of the wheel C be greater than the number of teeth of B' reversal of the direction of rotation of the driven shaft B will take place at a critical speed reach as the speed of the control nut D is reduced, and before it is reduced to zero the gear may thus be employed as a speed reverse gear.

In the arrangement shown in Fig. 2 A10 is driving shaft, B10 the driven shaft, B11 the spur wheel on the driven shaft and C10 the control member, C11 being the screw-threaded part of the latter, D10 the control nut, and $d11$ the flange of the latter bearing on the part A15. In this modification planetary pinions A11 mounted on the axes $a10$ carried by the casing A14 and cover A15 gear with the wheel B11; and the planetary pinions A13 mounted on the axles $a13$ carried by the casing gear with the wheel C10, and also the planetary pinions A11, the pinions A13 thus form intermediate planetary pinions which cause the wheel C10 to rotate in a direction opposite to that of the wheel B11.

For simplicity of description the wheels B11 and C10 are in this modification, as in Fig. 1, shown as having the same diameter and number of teeth.

In this modification if the speed of the control nut D10 be made equal to that of the casing, and in the same direction, the gear will rotate en bloc, that is to say, the driven shaft will rotate at the same speed as the driving shaft. The "hand" of the screw thread on the part C11 is such that any tendency of the wheel C10 to rotate faster than the speed of the control nut D10 causes an axial movement of the latter relatively to C10 such as to increase the frictional grip between the wheel C10 and the part A15. As described in connection with Fig. 1 once this frictional grip (between C10 and A15) has been established the secondary variable speed gear driving the control nut may be rendered inoperative, whereupon the gear will automatically rotate en bloc.

In modification Fig. 2 if the member C10 be free to rotate relatively to the casing, and resistance be offered to rotation of the driven shaft B10 the wheel B11 remains stationary; but the wheel C10, by reason of the interposition of the intermediate pinion A13, will rotate at a speed equal to twice that of the driving shaft and in the same direction. The speed of the control nut D10 to allow the wheel C10 to run free of the casing must therefore be twice that of the casing, and in the same direction; under these circumstances the driven shaft will be stationary.

If the speed of the driving shaft be 400, then by making the speed of the control nut D equal to 800 the driven shaft remains stationary; if D be driven at 400 the speed of the driven shaft is also 400; thus the speed of the driven shaft may be varied from that of the driving shaft to zero by varying the speed of the wheel D from 400 to 800.

The wheels B11 and C10 need not in this modification be of the same diameter and number of teeth, and each of the planetary pinicns A11 may take the form of two connected pinions of different diameters as in Fig. 1, mounted on the same spindle $a10$; one of the two connected pinions gearing with the wheel B11, and the other gearing through the intermediate planetary pinion A13 which in turn gears with wheel C10.

In Fig. 3, A20 is the driving and B20 the driven shaft, B21 a bevel wheel mounted on the driven shaft B20, the planetary pinions are bevel pinions mounted on studs $a20$ carried by the casing A24 and its cover A25, C20 is the control member which in this case is a bevel wheel gearing with the pinions A21. C21 is the screw-threaded part of the control member, D20 the control nut, and $d21$ the flange of the latter engaging the part A25, the action is similar to that described in connection with Fig. 2.

In Figs. 4 to 8, A30 and B30 are respectively the driving and driven shafts; A31 planetary pinions mounted on the axles $a30$ carried in the casing A34 and its cover A35, B31 is a spur wheel keyed to the driven shaft B30 gearing with the planetary pinions A31. C30 is the control member the spur wheel portion of which is geared to the planetary pinions A31 through intermediate planetary pinions A33 mounted on spindles $a$33 carried from the casing cover A35. D30 is the control nut and $d$31 the flange thereof engaging with the part A35.

The arrangement illustrated in Figs. 4 to 8, is similar to that of Fig. 2, except that the wheel C30 is smaller in diameter than the wheel B31.

A suitable secondary variable speed device for driving the member D30 from the driving shaft A30 is shown. A pulley P having a doubly coned rim is keyed to the boss of the casing A34 and meshes with the double cone member Q made in two parts, pressed together by a spring F, and feathered on a lay shaft T mounted in bearing levers I.

The levers I are keyed to a shaft $i$1 carried in bearings $i$6 formed on a bed plate H1 fitted with two brackets $h$2 which rotatably support the driving and driven shafts and the casing.

The levers I have angular movement imparted to them by means of a screw-threaded spindle $i$4 rotatable in but held against axial movement relatively to a swivelling bracket $i$3 fixed to one of the brackets $h$2; said screw-threaded spindle engaging with a pivoted nut $i$2 on one of the levers I, and being rotated by a handle $i$5. R is a cone member like P and is keyed to the shaft T; and S is a double coned member like Q and is feathered on the boss of the control member D30, the two parts of the cone member S being pressed together by a spiral spring G between one of the members of the flange D31 of the nut D30. It will be seen that the velocity ratio between the driving shaft A30 and the member D30 may continuously be varied by moving the shaft T relatively to the main gear whilst preserving parallelism between them, the effective diameter of the driven cones being reduced as the distance between the lay shaft and the main gear is reduced.

In this modification, as in the modifications already described, the gear rotates en bloc when the control member D30 and therefore the wheel C30 is driven in the same direction and at the same speed as the driving shaft; the "hand" of the screw-thread on C31 must be such that the frictional grip is increased if C30 tends to rotate more rapidly than D30.

In order to reduce the speed of the driven shaft the control member D30 thus requires to be driven in the same direction and at correspondingly higher speeds than that of the driving shaft and casing. When the speed of the control member D30, is equal to the speed at which the wheel C30 would rotate if the casing were driven and the wheel C30 were held stationary, the driven shaft is stopped; if said speed of the member D30 is less than the casing speed, a still further increase of speed of the member D30 will permit a reversal of direction of rotation to the driven shaft B30.

When the wheel attached to the driven shaft and the control wheel are equal and gear with the same planetary pinion as in Fig. 1, the speed of the driven shaft will be the speed imparted to the control member D; where however these wheels are unequal and gear with unequal coupled planetary pinions, or where intermediate planetary pinions are interposed, the relation between the rotation of the control member D and the speed of the driven shaft will depend upon the velocity-ratio of the epicyclic train; in all cases, however, when the speed of the driving and driven shafts are equal, the speed of the control member D is equal to that of the driving shaft.

Other conditions being the same the "hand" of the screw-threads on C' in Fig. 1 is opposite to that which will be required in Fig. 2, Fig. 3 and Figs. 4 to 8.

Having now particularly described my invention, I declare that what I claim and desire to secure by Letters Patent is:—

1. In speed varying gear, in combination; a driving shaft; a driven shaft; an epicyclic gear interposed between the driving shaft and the driven shaft; respective members of the said gear being driven by the driving shaft, being adapted to drive the driven shaft, and forming an engaging part and being mounted concentrically with a part driven by one of the other members of the epicyclic gear, and being adapted to be driven by frictional contact therewith; a control part mounted concentrically with the engaging part, one of these parts having a surface inclined to its plane of rotation and the other having a corresponding surface engaging therewith, said surfaces being adapted when there is relative angular movement between the two parts, to give axial movement between them, which axial movement in the one direction increases the said frictional contact and means for varying speed of the control part; substantially as described.

2. In apparatus as constructed in accordance with claim 1, connecting the wheel which forms the engaging part through an intermediate wheel to a planetary pinion gearing directly with the wheel connected to the driven shaft; substantially as described.

3. In apparatus constructed in accordance with claim 1, arranging the engaging member so that a screw-threaded boss thereof protrudes through the cover of the casing a shoulder on the said member bearing upon the inside facing of the cover; and mounting the control member in the form of a nut on the said screw-threaded part so that its inner facing is adapted to bear on the outside of the said cover and driving the said control part or nut from the driving shaft; substantially as described.

In testimony whereof I affix my signature.

JOHN STANDEN SHAW.